(12) United States Patent
Kim et al.

(10) Patent No.: US 7,254,338 B2
(45) Date of Patent: Aug. 7, 2007

(54) MULTI-WAVELENGTH LIGHT SOURCE

(75) Inventors: Jong-Kwon Kim, Daejeon (KR); Yun-Je Oh, Yongin-si (KR); Jun-Ho Koh, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 587 days.

(21) Appl. No.: 10/771,793

(22) Filed: Feb. 4, 2004

(65) Prior Publication Data

US 2005/0002670 A1 Jan. 6, 2005

(30) Foreign Application Priority Data

Jul. 4, 2003 (KR) ............. 10-2003-0045302

(51) Int. Cl.
*H04J 14/02* (2006.01)
(52) U.S. Cl. ............. 398/93; 398/87; 398/91; 398/180; 398/201
(58) Field of Classification Search ............. 398/87, 398/91–94, 97, 180, 201
See application file for complete search history.

(56) References Cited

U.S. PATENT DOCUMENTS 5,524,118 A * 6/1996 Kim et al. ............. 372/6
6,331,907 B1 * 12/2001 Miyazaki et al. ............. 398/9

FOREIGN PATENT DOCUMENTS

| JP | 08-078787 | 3/1996 |
| JP | 10-093164 | 4/1998 |

* cited by examiner

*Primary Examiner*—Leslie Pascal
(74) *Attorney, Agent, or Firm*—Cha & Reiter, LLC

(57) ABSTRACT

A multi-wavelength light source unit for optical communication system is disclosed. The light source includes a demultiplexer for demultiplexing a multiplexed light signal into a plurality of lights having different wavelengths and a multiplexer that receives the demultiplexed lights and multiplexes the demultiplexed lights into the multiplexed light signal. Input ports of the multiplexer are respectively port-to-port connectable to each one of a plurality of output ports of the demultiplexer. The light source unit includes a plurality of semiconductor optical amplifiers amplifying the demultiplexed lights output form the demultiplexer, and a plurality of beam splitters for splitting the amplified demultiplexed lights into two parts, so as to provide the respective input ports of the multiplexer with a split part of the lights, while to transmit the other part of the lights out of the beam splitters.

8 Claims, 3 Drawing Sheets

MULTI-WAVELENGTH LIGHT SOURCE

CLAIM OF PRIORITY

This application claims priority under 35 U.S.C. § 119 to an application entitled "Multi-Wavelength Light Source," filed in the Korean Intellectual Property Office on Jul. 4, 2003 and assigned Serial No. 2003-45302, the contents of which are incorporated herein by reference.

BACKGROUND OF THE INVENTION

1. Field of the Invention

The present invention relates generally to a wavelength division multiplexing optical communication system, and more particularly to a multi-wavelength light source unit capable of providing a plurality of light signals having different wavelengths.

2. Description of the Related Art

Conventional wavelength division multiplexing (WDM) communication systems generate multiplexed light signals from a plurality of light channels. The multiplexed light signal has extremely narrow wavelength spacing between the light channels. This allows for the transfer of more light signals on a predetermined optical communication wavelength band. Generally, it is known in the art that the WDM optical communication system serves to concurrently transfer a plurality o f multiplexed light beam signals with different wavelengths on a single optical fiber. One or more semiconductor laser devices, e.g. laser diodes, have been used as a light source for emitting light beams.

However, such semiconductor laser devices usually have very high sensitivity to changes in temperature. This has a critical disadvantage in that the oscillation frequency slightly fluctuates to changes in the ambient temperature. Since the wavelengths of demodulated light beams are positioned very close to each other, even a minor error in wavelength can cause interference with each other. For instance, when the semiconductor laser device fails to radiate light beams in its intended precise wavelength band owing to a change in its ambient temperature (or for any other reason), an optical receiver may be unable to identify those light beam signals in full due to light diffusion, loss of light or the like, which often inherently occurs in the course of transmission of light beams carried on the optical fiber. Further, while the light source may be able to precisely control the wavelength initially, it is usually very difficult to ensure long-term stability in the wavelength throughout its lifetime use.

Another example of a conventional light source device used in a WDM optical communication system is a multi-wavelength light source. Such light source devices include a plurality of light source units, each unit providing a different wavelength of light beam, and a set of multiplexer/demultiplexer for multiplexing or demultiplexing the light beam signals out of the light source units. A semiconductor laser device may be used as a light source for use in the multi-wavelength light source.

U.S. Pat. No. 6,545,784 (Optical cross connect unit, optical add-drop multiplexer, light source unit, and adding unit) to Okazaki, et al. discloses an apparatus for modulating a given wavelength of lights from a number of light sources into multiple lights so as to generate a plurality of lights having different wavelengths as desired. The above apparatus includes a plurality of light sources, an optical add/drop section for demultiplexing a plurality of different wavelengths of lights outputted from the light sources, and a plurality of filters for splitting the plurality of lights into respective different wavelengths of lights. The optical cross connect unit and multi-wavelength light source according to the apparatus of Okazaki, et al. further includes a plurality of modulators for modulating a plurality of light signals output from the multi-wavelength light source into electrical signals and then modulating the electrical signals into a predetermined wavelength of lights, thereby generating a desired wavelength of light signal. It renders a plurality of lights having different wavelengths out of a small number of light sources.

However, it is noted that the above-mentioned multi-wavelength light source unit requires an external modulating means for carrying out modulation of the optical signals into electrical signals to generate a plurality of lights having predetermined different wavelengths. As a result, such an additional modulator has disadvantageous effects, e.g., an increase in the overall volume of optical apparatus and increase in production cost.

Accordingly, there is a need in the art for an improved multi-wavelength light source.

SUMMARY OF THE INVENTION

One embodiment of the present invention is directed to a wavelength division multiplexing (WDM) optical communication system with a multi-wavelength light source unit that does not require to use any external modulators, so as to achieve reduction of its production cost.

Another embodiment of the present invention is directed to a multi-wavelength light source unit including a demultiplexer having an input port at one end to receive a multiplexed light signal and a plurality of output ports at its opposite end, for demultiplexing the multiplexed light signal into a plurality of lights having different wavelengths, so that the respective demultiplexed light with a predetermined wavelength is outputted from each one of the output ports, and a multiplexer having a plurality of input ports at one end to receive the demultiplexed lights, and an output port at its opposite end, for multiplexing the demultiplexed lights into the multiplexed light signal, so that the multiplexed light signal is output from the output port of the multiplexer, the plurality of input ports of the multiplexer being respectively port-to-port connectable to each one of the plurality of output ports of the demultiplexer. The unit also includes a plurality of semiconductor optical amplifiers each disposed between the output ports of the demultiplexer and the input ports of the multiplexer, for making an amplification of the demultiplexed lights outputted form the demultiplexer, and a plurality of beam splitters each disposed between the semiconductor optical amplifiers and the input ports of the multiplexer, for splitting the amplified demultiplexed lights into two parts, so as to provide the respective input ports of the multiplexer with a split part of the lights, while to transmit the other part of the lights out of the beam splitters.

In another embodiment, the multi-wavelength light source unit further includes an optical band-pass filter disposed between the input port of the demultiplexer and the output port of the multiplexer, for passing to the demultiplexer the light signal only in a predetermined wavelength band of the multiplexed light signal from the multiplexer.

In yet another embodiment, the multi-wavelength light source unit further includes an optical isolator disposed between the optical band-pass filter and the multiplexer, for blocking the light signal component reflected to the multiplexer from the optical band-pass filter.

In a further embodiment, optical arrayed waveguide gratings having a planar lightguide circuit structure may be used as the multiplexer, and a 1×N optical coupler may be used for the multiplexer. Furthermore, optical arrayed waveguide gratings of planar lightguide circuit structure may be used the demultiplexer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
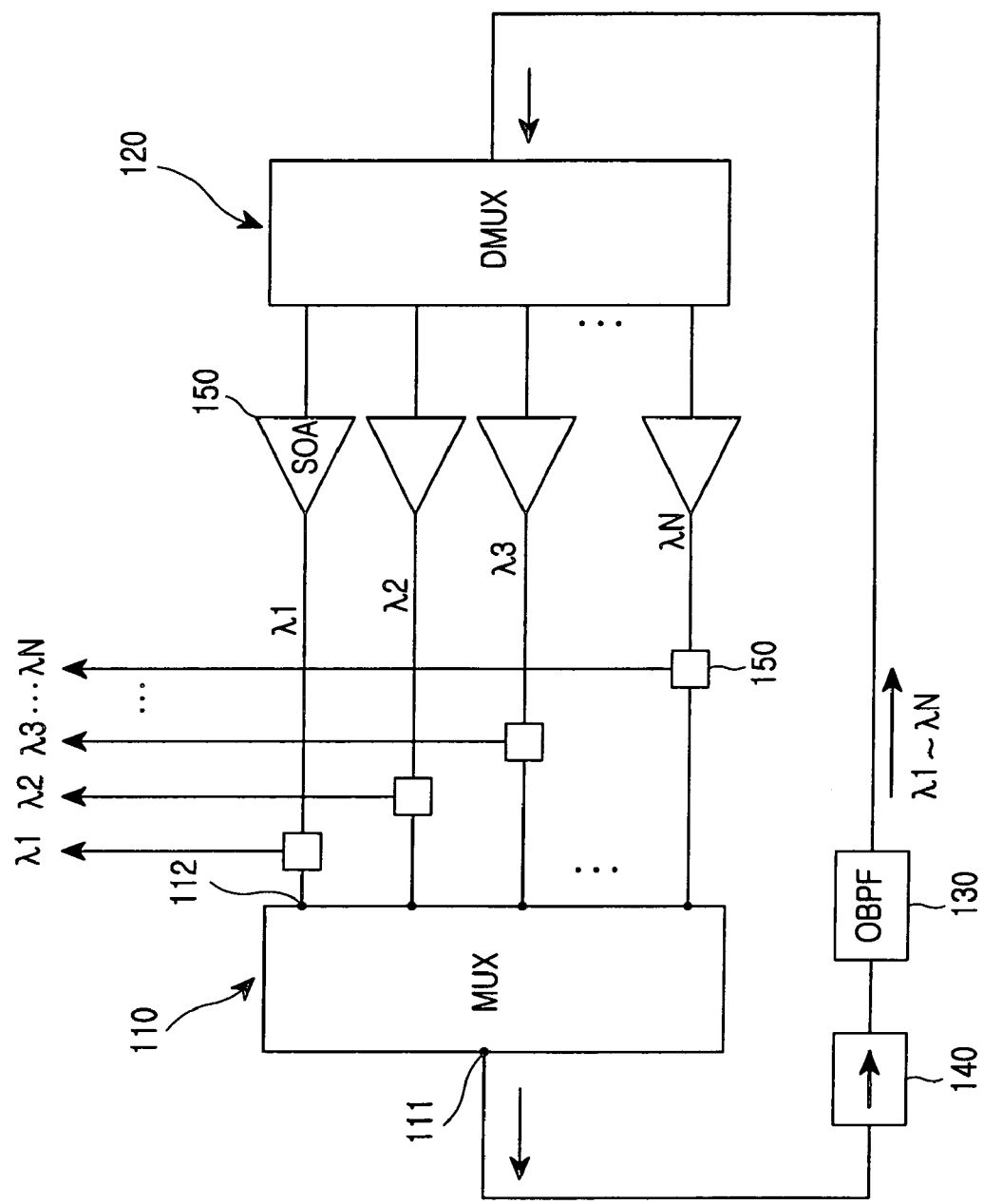
FIG. 1 is a block diagram illustrating the configuration of an embodiment of a multi-wavelength light source according to the present invention having a set of multiplexer and a demultiplexer configured of optical arrayed waveguide gratings.

Now, embodiments of the present invention will be described in detail with reference to the annexed drawings. In the drawings, the same or similar elements are denoted by the same reference numerals even though they are depicted in different drawings, wherein any detailed description of known functions and configurations incorporated herein will be omitted when they may obscure the subject matter of the present invention.

Referring now to FIG. 1, the configuration of an embodiment of a multi-wavelength light source according to the present invention is shown. The multi-wavelength light source includes a multiplexer 110 and a demultiplexer 120 configured of optical arrayed waveguide gratings. The demultiplexer 120 demultiplexes a multiplexed optical signal into a plurality of lights and the multiplexer 110 multiplexes the plurality of demultiplexed light signals $\lambda 1$ to $\lambda n$ delivered from the demultiplexer 120. The multi-wavelength light source unit further includes a plurality of semiconductor optical amplifiers 150 for amplifying the demultiplexed light signals, a plurality of beam splitters 160 connected to each optical amplifier 150, for spitting the demultiplexed light signals $\lambda 1$ to $\lambda n$, and an optical band-pass filter (OBPF) 130. An isolator 140 is connected between the multiplexer 110 and the optical band-pass filter 130.

The demultiplexer 120 has an input port 121 and a plurality of output ports 122. The demultiplexer 120 may be configured using a planar lightguide circuit (PLC) provided with an arrayed waveguide grating (AWG) structure. The demultiplexer 120 serves to receive the multiplexed light signal $\lambda_N$ at the input port 121 and to output the plurality of demultiplexed lights $\lambda 1$ to $\lambda n$ through its output ports 122, in such a manner that each of the demultiplexed lights is provided with a specified wavelength different from others.

The multiplexer 110 has a plurality of input ports 112 and an output port 111. The input ports 112 are respectively coupled with the output ports 122 of the demultiplexer 120 via each optical amplifier 150. The multiplexer 110 receives the demultiplexed lights $\lambda 1$ to $\lambda n$ through the input ports 112 to output a multiplexed light signal $\lambda_N$ through the output port 111 connected to the input port 121 of the demultiplexer 120. The respective input port 112 of the multiplexer 110 is connected one by one to extend to each one of the output ports 122 of the demultiplexer 120 through a corresponding beam splitter 160. The multiplexer 110 provides the multiplexed light signal $\lambda_N$ through the output port 111 and may be configured of a planar lightguide circuit (PLC) with the arrayed waveguide grating (AWG) structure, similar to that of the demultiplexer 120.

The plurality of semiconductor optical amplifiers 150 are respectively connectable between the input ports 112 and the output ports 122 to amplify each of the demultiplexed lights $\lambda 1$ to $\lambda n$ received from the output ports of the demultiplexer 120. This semiconductor optical amplifier does not require any external modulators to modulate an optical signal into an electrical signal or an electrical signal into an optical signal, and it radiates a spontaneous emission light ray in its initial operation of the multi-wavelength light source unit.

The beam splitters 160 each are disposed in between the input ports 112 and the semiconductor optical amplifiers 150 coupled to each other, so that a part of the light output from each of the semiconductor optical amplifiers 150 is split out of the respective beam splitter and the remaining part of the light is delivered into the respective input ports of the multiplexer 110 through the beam splitter. The optical band-pass filter (OBPF) 130 is positioned between the input port 121 of the demultiplexer 120 and the output ports 111 of the multiplexer 110, so that it passes to the input port 121 the light signal only in a predetermined band of wavelength of the multiplexed light signal $\lambda_N$ outputted from the multiplexer 110.

The isolator 140 is disposed between the output port 111 of the multiplexer 110 and the optical band-pass filter 130, so that it serves to block the light signal that may be reflected from the band-pass filter 130 to the output port 111.

In the above-described multi-wavelength light source unit, a plurality of the spontaneous emission lights radiated from the semiconductor optical amplifiers 150, which lights have different wavelengths from each other, are respectively fed to the input ports 112 of the multiplexer and then converted into a multiplexed light signal $\lambda_N$ in the multiplexer 110. The multiplexed light signal is then delivered to the optical band-pass filter 130, so that it selectively passes the light signal only in the predetermined wavelength band of the multiplexed light signal $\lambda_N$ from the multiplexer 110. The band-pass multiplexed light signal is then fed to the input port 121 of the demultiplexer 120, which carries out a demultiplexing from the multiplexed light signal back to a plurality of demultiplexed lights $\lambda 1$ to $\lambda n$ with different wavelengths. The demultiplexed lights each output from the demultiplexer are then amplified in the semiconductor optical amplifiers 150 and split into two parts via the respective beam splitters 160, wherein one part of the split light is respectively delivered to the corresponding input port 112 of the multiplexer 110, while the other part of the split light is emitted out of the beam splitters 160.

Figure 2:
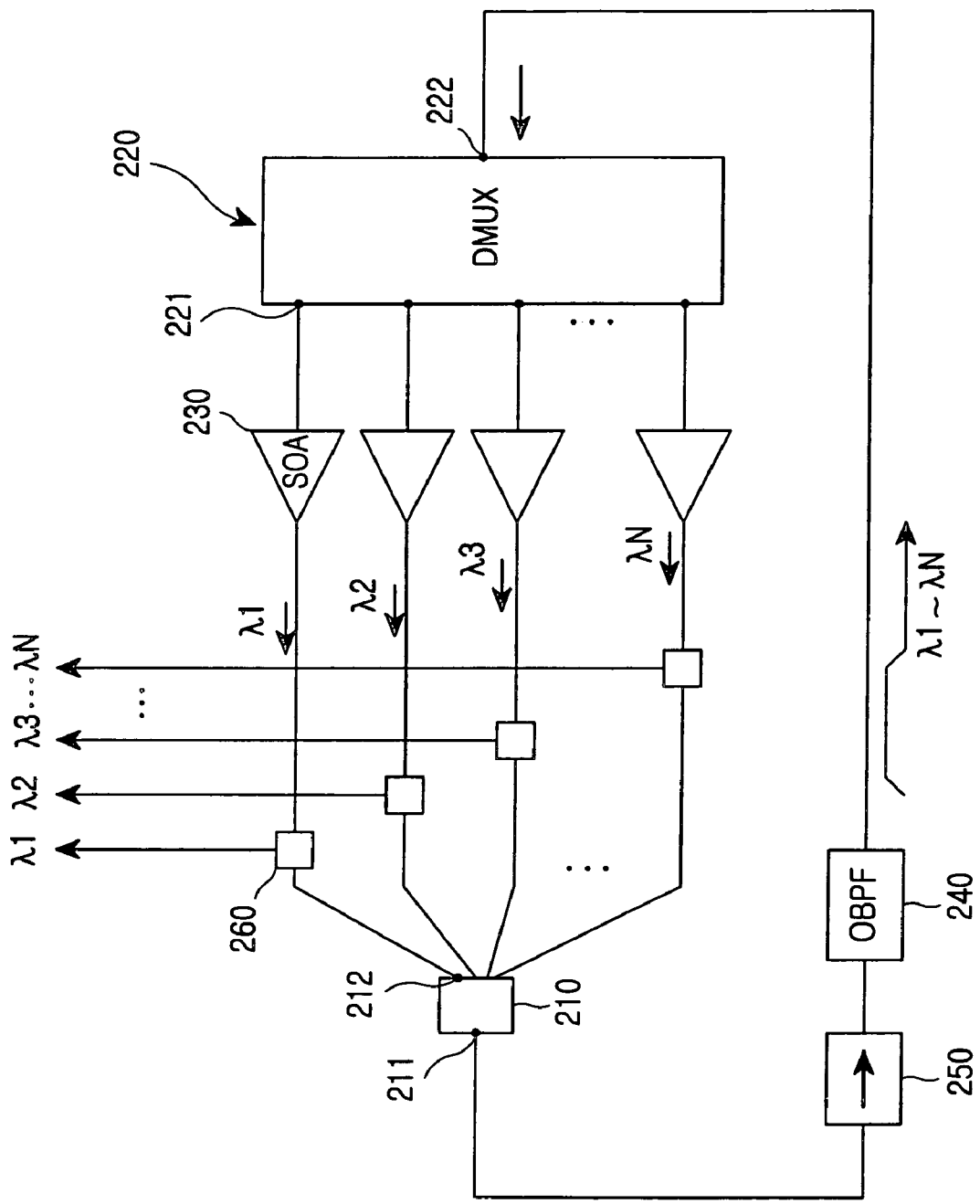
FIG. 2 is a block diagram illustrating the configuration of another embodiment of a multi-wavelength light source according to the present invention having a photo coupler for a multiplexer and an arrayed waveguide grating for a demultiplexer.

Referring now to FIG. 2, the configuration of another embodiment of the multi-wavelength light source according to the present invention is shown. In this embodiment, a photo coupler may be used for a multiplexer and an optical arrayed waveguide grating (AWG) for a demultiplexer. This multi-wavelength light source unit has the demultiplexer 220 for demultiplexing a multiplexed optical signal $\lambda_N$ into a plurality of lights $\lambda 1$ to $\lambda n$, and the multiplexer 210 for carrying out a multiplexing of the plurality of demultiplexed light signals $\lambda 1$ to $\lambda n$. The multi-wavelength light source unit further includes a plurality of semiconductor optical amplifiers 230 for making amplification to the demultiplexed lights, a plurality of beam splitters 260 connected to each optical amplifier 230, for spitting the demultiplexed light signals λ1 to λn, and an optical band-pass filter (OBPF) 240. An isolator 250 is disposed between the multiplexer 210 and the optical band-pass filter 240. The configuration and operation of the second embodiment in FIG. 2 is similar to that of the first embodiment if FIG. 1, so unnecessary details on this second embodiment of the multi-wavelength light source according to the present invention will be omitted.

The demultiplexer 220 having an input port 222 and a plurality of output ports 221, is configured of arrayed waveguide grating (AWG) structure. The demultiplexer 220 receives the multiplexed light signal $\lambda_N$ at the input port 222 and then outputs the plurality of demultiplexed lights λ1 to λn through the output ports 221, in according with wavelengths different from others.

The multiplexer 210 includes a 1×N optical coupler with a plurality of input ports 212 and an output port 211. The input ports 212 are respectively coupled with the output ports 221 of the demultiplexer 220 via each optical amplifier 230. The multiplexer 210 receives the demultiplexed lights λ1 to λn through the input ports 212 to output a multiplexed light signal $\lambda_N$ through the output port 211 connected to the input port 222 of the demultiplexer 220.

A plurality of semiconductor optical amplifiers 230 are respectively connected between the input ports 212 and the output ports 221 to make amplification to each of the demultiplexed lights λ1 to λn received from the output ports 221 of the demultiplexer 220.

The beam splitters 260 are respectively disposed in between the input ports 212 of the multiplexer 210 and the semiconductor optical amplifiers 230, so that a portion of the light output from each of the semiconductor optical amplifiers 230 is split out of the respective beam splitter and the remaining portion of the light is delivered into the input ports 212 of the multiplexer 210 through the beam splitter itself. The optical band-pass filter (OBPF) 240 is positioned between the input port 222 of the demultiplexer 220 and the output ports 211 of the multiplexer 210, and the isolator 250 is disposed between the output port 211 of the multiplexer 210 and the optical band-pass filter 240, so that it passes to the input port 222 the light signals only in a predetermined band of wavelength of the multiplexed light signal $\lambda_N$ outputted from the multiplexer 210, thereby effecting a blocking of the light signal to be reflected possibly from the band-pass filter 240 back to the multiplexer 210.

Figure 3:
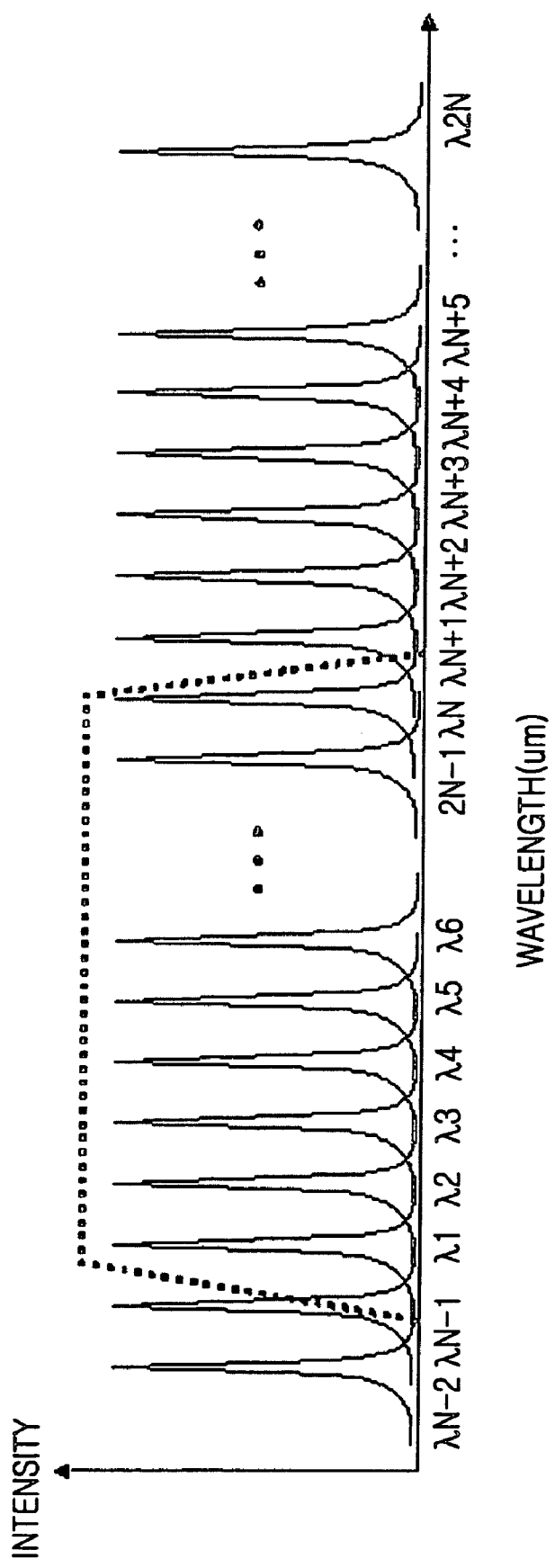
FIG. 3 is a view illustrating operating characteristics of an optical band pass filter (OBPF) of FIGS. 1 and 2.

FIG. 3 shows a schematic graphic diagram of the operating characteristics of the optical band pass filter (OBPF) in FIGS. 1 and 2. Referring to the graph of FIG. 3, it will be understood that it passes to the demultiplexer the light signals only in a predetermined band of wavelengths, e.g. λ1 to λn of the multiplexed light signal $\lambda_N$ output from the multiplexer 210, while it serves to block any other unnecessary bands of wavelengths (e.g. $\leq \lambda_{N-1}$, $\geq \lambda_{N+1}$)

Accordingly, the multi-wavelength light source units having the semiconductor optical amplifiers according to aspects of the present invention do not require any external modulators to modulate an optical signal into an electrical signal or an electrical signal into an optical signal.

As apparent from the foregoing description, the multi-wavelength light source units according to aspects of the present invention are adapted to use a plurality of semiconductor optical amplifiers as a light source. Because of this, it does not require any further external modulators to modulate an optical signal into an electrical signal and then the electrical signal to a predetermined wavelength of lights. Therefore, removal of such an external modulator allows more compact design and construction of a multi-wavelength light source unit, so that it can achieve the considerable cost reduction and down sizing in manufacturing of the light source units.

Although the several embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims that follow, along with their full scope of equivalents.

What is claimed is:

1. A multi-wavelength light source unit for use in an optical communication system, comprising:

a demultiplexer having an input port configured to receive a multiplexed light signal and a plurality of output ports configured to demultiplex the multiplexed light signal into a plurality of lights having different wavelengths and configured to output respective demultiplexed light with a predetermined wavelength;

a multiplexer having a plurality of input ports configured to receive the demultiplexed lights and an output port configured to multiplex the demultiplexed lights into the multiplexed light signal and configured to output the multiplexed light signal, the plurality of input ports of the multiplexer being respectively port-to-port connectable to each one of the plurality of output ports of the demultiplexer;

a plurality of semiconductor optical amplifiers each disposed between the output ports of the demultiplexer and the input ports of the multiplexer, the semiconductor optical amplifiers being configured to amplify the demultiplexed lights output form the demultiplexer;

a plurality of beam splitters each disposed between the semiconductor optical amplifiers and the input ports of the multiplexer, the beam splitters being configured to split the amplified demultiplexed lights into two parts and being configured to provide the respective input ports of the multiplexer with a split part of the lights, while to transmit the other split part of the lights out of the beam splitters;

an optical band-pass filter disposed between the input port of the demultiplexer and the output port of the multiplexer, the optical band pass filter being configured to pass to the demultiplexer the light signal only in a predetermined wavelength band of the multiplexed light signal from the multiplexer; and an optical isolator being disposed between the optical band-pass filter and the multiplexer, the optical isolator being configured to block the light signal component reflected to the multiplexer from the optical band-pass filter.

2. The multi-wavelength light source unit as set forth in claim 1, wherein the multiplexer includes optical arrayed waveguide gratings having a planar lightguide circuit structure.

3. The multi-wavelength light source unit as set forth in claim 1, wherein the multiplexer includes an 1×N optical coupler.

4. The multi-wavelength light source unit as set forth in claim 1, wherein the demultiplexer includes optical arrayed waveguide gratings having a planar lightguide circuit structure.

5. A multi-wavelength light source unit, comprising:
a demultiplexer arranged to demultiplex a multiplexed light signal into a plurality of lights having different wavelengths;
a multiplexer arranged to multiplex the demultiplexed lights into the multiplexed light signal;
a plurality of semiconductor optical amplifiers arranged to amplify the demultiplexed lights output form the demultiplexer;
a plurality of beam splitters arranged to provide at least a portion of one or more of the amplified demultiplexed lights to the multiplexer;
an optical band-pass filter arranged to pass to the demultiplexer the light signal only in a predetermined wavelength band of the multiplexed light signal from the multiplexer; and
an optical isolator being interposed between the optical band pass filter and the multiplexer, the optical isolator being arranged to block the light signal component reflected to the multiplexer from the optical band-pass filter.

6. The multi-wavelength light source unit as set forth in claim 5, wherein the multiplexer includes optical arrayed waveguide gratings having a planar lightguide circuit structure.

7. The multi-wavelength light source unit as set forth in claim 5, wherein the multiplexer includes a 1×N optical coupler.

8. The multi-wavelength light source unit as set forth in claim 5, wherein the demultiplexer includes optical arrayed waveguide gratings having a planar lightguide circuit structure.

* * * * *